Patented June 4, 1946

2,401,522

UNITED STATES PATENT OFFICE 2,401,522

AROMATIC CARBOXYLIC ACID AMIDES AND A PROCESS FOR THEIR MANUFACTURE

Arthur Stoll, Rudolf Morf, and Julius Peyer, Basel, Switzerland, assignors to the firm Sandoz Ltd., Fribourg, Switzerland No Drawing. Application March 25, 1943, Serial No. 480,566. In Switzerland April 17, 1942

8 Claims. (Cl. 260—302)

The present invention relates to new therapeutically valuable aromatic carboxylic acid amides and to a process for their preparation.

It has been found that new aromatic carboxylic acid amides can be prepared by causing aromatic carboxylic acids or their reactive derivatives, like azides, chlorides, esters and the like, to react with amino derivatives of heterocyclic 5-rings.

The preparation of the said carboxylic acid amides can be carried out by well-known processes, preferably in the presence of diluting agents, such as water, ethers, esters, pyridine and the like, and in the presence of condensing agents, such as sodium carbonate, sodium acetate, dimethylaniline, pyridine, and the like.

The said carboxylic acids or their derivatives may contain in the aromatic nucleus substituents such as hydroxy groups, chlorine, substituted amino groups, nitro, cyano, nitrile, sulphonic acid groups and the like, whereby the hydroxy group linked to the aryl nucleus may also be substituted by an acyl, alkyl, aralkyl or aryl group.

As heterocyclic 5-rings we use the amino compounds of the series of aminopyrrols, aminofuranes, aminothiophenes, aminoimidazols, aminopyrazols, aminooxazols, aminothiazols, aminotriazols, aminotetrazols, as well as their benzo, dibenzo and naphtho derivatives.

The amino groups of the heterocyclic 5-ring compounds can be directly linked to the 5-ring or be bound to the same by means of any atom grouping while the amino group may also be a secondary amino group, in which one of the hydrogens is substituted by an acyl, alkyl, aryl or a sulphonic acid radical. As is evident from the claims hereunto appended, preferred products are those derived from 2-acetoxybenzoyl-chloride and 2-aminothiazol, 2-amino-4-methyl-thiazol or 2-(2'-hydroxybenzoyl)-aminothiazol.

The compounds prepared according to the present process possess valuable therapeutical properties and can be used as disinfectants and conserving agents.

The invention is illustrated, but not limited, by the following examples in which the parts are by weight.

Example 1

7 parts of 2-aminothiazol are dissolved in dry ethylether and treated at about 0° C. with an ethereal solution of 14 parts of 2-acetoxybenzoylchloride. The ether is then poured off from the difficultly soluble reaction product and the new compound dissolved in dilute hydrochloric acid. From this solution it is precipitated by means of an excess of ammonia and, after separation, recrystallised from ethanol. The easily soluble part of the product melts after several recrystallisations from ethanol at 140°–142° C. (corr.) and represents the 2-acetoxybenzoyl-2-aminothiazol of the formula

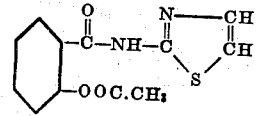

On analysis the following results have been obtained:

$C_{12}H_{10}O_3N_2S$: Calculated, C 55.0, H 3.8, N 10.7%; found, C 55.5, H 4.1, N 10.9%.

The part of the product which is more difficultly soluble in ethanol is o-hydroxybenzoyl-2-aminothiazol, which has been produced by deacetylation during the reaction.

Example 2

5 parts of 2-aminothiazol are dissolved in dry benzene and treated with a solution of 9.5 parts of o-hydroxybenzoylchloride dissolved in benzene. The reaction product is then isolated, as described in Example 1, and recrystallised several times from ethanol. The o-hydroxybenzoyl-2-aminothiazol sinters at 250° C. and melts while turning brown at 257° C. (corr.). It possesses the formula:

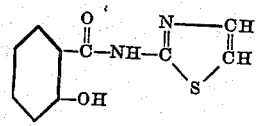

On analysis the following values have been found:
$C_{10}H_8O_2N_2S$: Calculated, C 54.5, H 3.7, N 12.7%; found, C 54.8, H 4.0, N 12.7%.

Example 3

3 parts of free β-imidazolylethylamine dried in high vacuo are suspended in 50 parts of dry chloroform. To this suspension are added in small portions 5.5 parts of o-hydroxybenzoylchloride and the mixture is shaken during several hours.

Thus a milky reaction solution is obtained containing a compound which is only difficultly soluble in chloroform. The chloroform is then evaporated in vacuo and the reaction product heated to boiling with diluted aqueous ethanol. After filtration and standing in the cold, 2.5 parts of N - (β-imidazolylethylamino) -o-hydroxybenzamide are obtained which, after several recrystallisations, melts at 215° C. The new compound possesses the formula

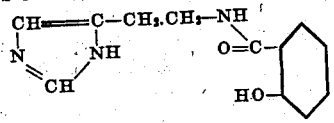

and gives on analysis the following results:
C12H13O2N3: Calculated, C 62.3, H 5.6, N 18.2%; found, C 62.7, H 5.6, N 18.3%.

Example 4

11.8 parts of 2-acetoxybenzoylchloride are dissolved in 60 parts of dry chloroform. To this solution is added, while vigorously stirring, in small parts a solution of 5.7 parts of methylglycocyamidine in 5 parts of dry pyridine. After heating under reflux and with good stirring during 1 hour, the reaction mixture is allowed to stand for 24 hours. After this time, chloroform and the excess of pyridine are distilled in vacuo and the residue treated with water, filtered and brought to crystallisation. After several recrystallisations from hot water the N-(methylglycocyamidine)-2-hydroxybenzamide will be obtained as hydrate in pure form; it melts at 203° C. (corr.) and possesses the formula

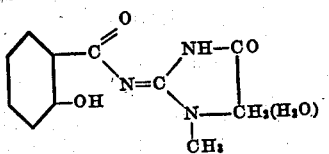

On analysis the following values have been obtained:
C11H11O3N3 (H2O): Calculated, C 52.6, H 5.2, N 16.8%; found, C 53.0, H 5.4, N 16.8%.

Example 5

5.3 parts of 4-amino-(1-phenyl-2:3-dimethylpyrazolone) are dissolved in 40 parts of water and, while vigorously stirring and cooling during 1 hour, treated in small portions with 7.5 parts of 2-acetoxybenzoylchloride and 120 parts of normal sodium hydroxide solution. At the end of the reaction the whole is warmed up and neutralised with a 10% aqueous solution of hydrochloric acid. During this operation the reaction product is precipitated and subsequently purified by repeated recrystallisation from ethanol. The melting point of the new compound is 219° C.; it possesses the following formula

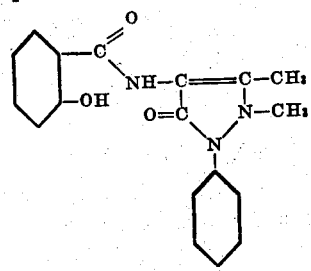

On analysis the following values have been obtained:
C18H17O3N3: Calculated. C 66.8, H 5.2, N 13.0%; found, C 66.9, H 5.2, N 13.1%.

Example 6

2 parts of 2-amino-4-methylthiazol are dissolved in 20 parts of dry chloroform and treated, while stirring, in 3 portions with a solution of 3.9 parts of 2-acetoxybenzoylchloride in 4 parts of dry pyridine. The reaction medium is then allowed to stand during 30 hours in the absence of water. A crystal paste will be obtained from which the pyridine is extracted by a repeated washing-out by means of water. The chloroform solution is then evaporated and the remaining reaction product crystallised from glacial acetic acid. Thus needles having a melting point of 243° C. (corr.) will be obtained. The new compound possesses the formula

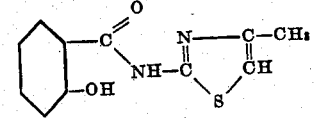

and on analysis gives the following values:
C11H10O2N2S: Calculated, C 56.4, H 4.3, N 11.9%; found, C 56.5, H 4.1, N 11.9%.

Example 7 parts of 2-amino-4-methylthiazol are dissolved in 50 parts of dry dioxane and treated, while vigorously stirring, at 20° C. during 15 minutes with a solution of 5.8 parts of 2-acetoxybenzoylchloride in 20 parts of dry dioxane. After standing in the cold, the di-(2'-hydroxybenzoyl)-amino-2:4-methylthiazol crystallises out in colorless tables. After repeated recrystallisation from dioxane the new product is purer and has the melting point of 143° C. (corr.). Its formula is

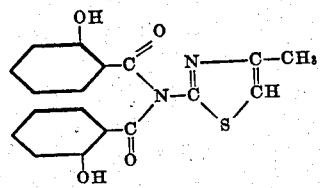

On analysis following results will be obtained:
C18H14O4N2S: Calculated, C 61.0, H 4.0, N 7.9%; found, C 60.9, H 4.4, N 7.9%.

In this reaction 2 other compounds are formed which have been identified as (2'-hydroxybenzoyl)-2-amino-4-methylthiazol and its O-acetyl derivative.

Example 8

4.5 parts of 2-(2'-hydroxybenzoyl)-aminothiazol are dissolved in the theoretical quantity of a half normal sodium hydroxide solution and treated at about 30° C. under good stirring in small portions with a solution of 4.4 parts of 2-acetoxybenzoylchloride and 40 parts of a half normal sodium hydroxide solution. After standing for some time the reaction mass is neutralised with 10% hydrochloric acid and the product thus precipitated is separated. After several recrystallisations the new compound melts at 138° C. It possesses the formula

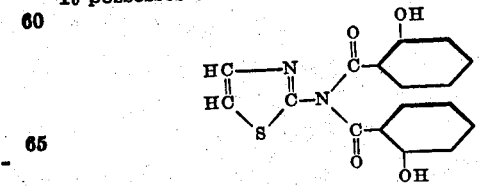

and gives on analysis the following values:
C17H12O4N2S: Calculated, C 60.0, H 3.5, N 8.2%; found, C 60.1, H 4.0, N 8.3%.

Example 9

10 parts of 2-aminothiazol and 10 parts of pyridine are dissolved in ether, cooled down to 5° C. and treated in small portions with good stirring with a solution of 14 parts of benzoylchloride in ether. After the addition has been terminated, the reaction mixture is allowed to stand over night at room temperature. Thereupon half of the quantity of the ether is distilled off and the remaining solution, after cooling down, is filtered from the precipitation. The same is then treated with warm water in order to separate the pyridine hydrochloride, filtered and washed with water. After recrystallisation from diluted ethanol, the 2-benzoylaminothiazol is obtained in pure form as colorless needles melting at 153°–155° C.

The new product corresponds to the formula

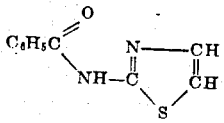

and gives on analysis, after drying in vacuo at 80° C., the following values:

$C_{10}H_8ON_2S$: Calculated, N=13.72%; found, N=13.45%, 13.55%.

*Example 10*

22 parts of p-carbethoxybenzoylchloride, dissolved in 150 parts of ethylether, are added slowly and with cooling and good stirring to a solution of 22 parts of 2-aminothiazol dissolved in 50 parts of dioxane and 200 parts of ether. After standing for several hours at room temperature, the precipitate consisting of amide and of aminothiazolhydrochlorhydrate is filtered off and separated from the latter by treating it with water. The raw amide is then crystallised from ethanol. The 2-p-carbethoxybenzoylaminothiazol possesses the formula

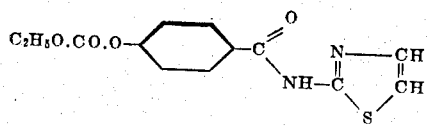

and crystallises in form of thin white silky needles melting at 165°–167° C.

In order to saponify the carbethoxy group the new product is dissolved in 100 parts of ethanol and 100 parts of a 2N sodium hydroxide solution, heated very rapidly to about 60° C., and treated with acetic acid until neutral reaction on litmus has been reached. Under strong development of carbon dioxide, the 2-p-hydroxybenzoylaminothiazol precipitates in form of white thin prisms. After recrystallisation the new product melts at 252°–254° C. It corresponds to the formula

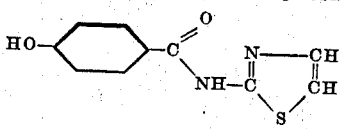

and gives on anaylsis the following values:

$C_{10}H_8O_2N_2S$: Calculated, N=12.73%; found, N=12.54%, 12.70%.

*Example 11*

A solution of 20 parts of veratroylchloride in acetone is added, in small portions, to a solution of 22 parts of 2-aminothiazol in acetone. During the interreaction the temperature is kept by cooling at about 5°–8° C. After standing over night the solvent is filtered off and the precipitate extracted by means of warm water in order to separate aminothiazolhydrochloride. The residue is then crystallised from ethanol and gives, on recrystallisation, long white needles or prisms melting at 165°–167° C. The 2-veratroylaminothiazol possesses the formula

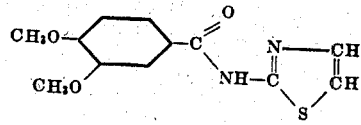

and gives on analysis the following values:

$C_{12}H_{12}O_3N_2S$: Calculated, N=10.60%; found, N=10.65%, 10.68%.

*Example 12*

A solution of 22 parts of 2-aminothiazol in a mixture of dioxane and ethylether is treated at 5°–3° C., with a solution of 17.1 parts of anisoyl chloride in 150 parts of ether. After standing over night, the solvent is poured away, the residue washed with warm water and crystallised from acetic acid. For further purification it is recrystallised from dioxane, whereby colorless small rhombs of melting point 207°–209° C. will be obtained. The 2-anisoyl-aminothiazol possesses the formula

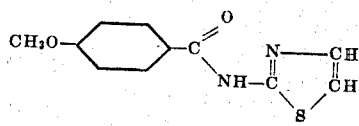

and gives on analysis the following values:

$C_{11}H_{10}O_2N_2S$: Calculated, N=11.97%; found, N=11.88%, 11.99%.

*Example 13*

22 parts of 2-aminothiazoyl dissolved in a mixture of 100 parts of pure dioxane and 100 parts of ethylether are treated at 5°–10° C. with small portions of a solution of 21 parts of 2:3-hydroxynaphthoic acid chloride, dissolved in 200 parts of ether. After standing for about 2 days at room temperature, the precipitate is separated and treated with warm water in order to separate the aminothiazol hydrochloride. The residue is then dissolved in 50% aqueous alcohol under addition of a 2 N sodium hydroxide solution. After filtration the solution is heated and treated with acetic acid until the alkaline reaction disappears. The new amide precipitates as a yellow-brownish crystalline powder, which, for further purification, is recrystallised from dioxane. Fine clear yellow needles of melting point 303°–305° C. will thus be obtained. The 2-(2:3-hydroxynaphthoyl)-aminothiazol possesses the formula

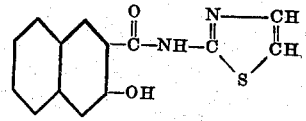

and gives on analysis the following results:

$C_{14}H_{10}O_2N_2S$: Calculated, N=10.37%; found, N=10.44%, 10.45%.

*Example 14*

On working in the manner described in the above examples, the 2-cinnamoylaminothiazol can be prepared. It crystallises from dilute ethanol in form of white needles of melting point 243°–245° C. and corresponds to the formula

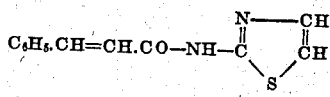

On analysis the following values have been obtained:

$C_{12}H_{10}ON_2S$: Calculated, N=11.90%; found, N=12.14%, 12.26%.

Example 15

On working as above described, the 2-phenylacetylaminothiazol may be produced. This new compound crystallises from ethanol in form of white needles of melting point 163°–165° C. and corresponds to the formula

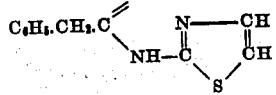

On analysis the following values have been obtained:

$C_{11}H_{10}ON_2S$: Calculated, $N=12.84\%$; found, $N=12.91\%, 12.94\%$.

What we claim is:

1. A process for the manufacture of a new aromatic carboxylic acid amide comprising the step of condensing 2-acetoxybenzoylchloride with 2-aminothiazol.

2. A process for the manufacture of a new aromatic carboxylic acid amide comprising the step of condensing two molecules of 2-acetoxybenzoylchloride with one molecule of 2-amino-4-methylthiazol.

3. A process for the manufacture of a new aromatic carboxylic acid amide comprising the step of condensing 2-acetoxybenzoylchloride with 2-(2'-hydroxybenzoyl)-aminothiazol.

4. The amide of the formula

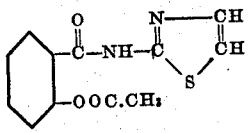

melting at 140°–142° C.

5. The amide of the formula

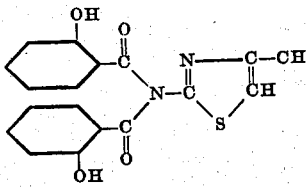

melting at 143° C.

6. The amide of the formula

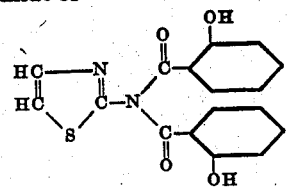

melting at 138° C.

7. A process for the manufacture of an acetoxyaryl carboxylic acid amidothiazol which comprises condensing 2-acetoxybenzoylchloride with a member selected from the group consisting of 2-aminothiazol, 2-amino-4-methylthiazol and 2-(2'-hydroxybenzoyl)-aminothiazol.

8. An amide of the formula

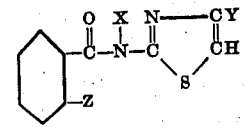

wherein X is a member selected from the group consisting of

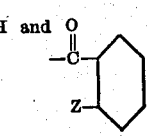

Y is a member selected from the group consisting of H and $CH_3$, and Z is a member selected from the group consisting of free and esterified hydroxyl.

ARTHUR STOLL.
RUDOLF MORF.
JULIUS PEYER.